United States Patent [19]

Ljungberg

[11] Patent Number: 5,454,942
[45] Date of Patent: Oct. 3, 1995

[54] APPARATUS FOR THE REMOVAL OF FLOATING SLUDGE IN DISSOLVED AIR FLOATATION BASINS AT WATER PURIFICATION AND WASTE WATER TREATMENT PLANTS

[75] Inventor: Bertil A. Ljungberg, Fjaras, Sweden

[73] Assignee: Anglian Water PLC, Cambridgeshire, England

[21] Appl. No.: 294,362

[22] Filed: Aug. 23, 1994

[51] Int. Cl.⁶ .......................... B01D 17/035; B01D 21/20
[52] U.S. Cl. ...................... 210/221.2; 210/703; 210/776; 210/527
[58] Field of Search ................................... 210/703, 776, 210/221.2, 538, 525, 527

[56] References Cited

U.S. PATENT DOCUMENTS

| | | |
|---|---|---|
| 1,916,460 | 7/1933 | Bousman . |
| 1,918,742 | 7/1933 | Elrod . |
| 2,033,500 | 3/1936 | Wiard . |
| 2,135,442 | 11/1938 | Steindorf . |
| 2,159,409 | 5/1939 | Tark . |
| 2,305,929 | 12/1942 | Lund et al. . |
| 2,822,928 | 2/1958 | Wormser . |
| 2,994,432 | 8/1961 | Schluter . |
| 3,635,349 | 1/1972 | Weiss . |
| 3,741,399 | 6/1973 | Peterson . |
| 3,872,017 | 3/1975 | Bishop . |
| 3,935,104 | 1/1976 | Russell . |
| 4,054,520 | 10/1977 | McGivern . |
| 4,144,173 | 3/1979 | Pielkenrood . |
| 4,193,871 | 3/1980 | White . |
| 4,257,900 | 3/1981 | White . |
| 4,417,983 | 11/1983 | Smigerski et al. . |
| 4,432,870 | 2/1984 | Russell . |
| 4,476,018 | 10/1984 | White . |
| 4,486,309 | 12/1984 | Krodel . |
| 4,610,785 | 9/1986 | Russell . |
| 4,681,682 | 7/1987 | White . |
| 4,913,805 | 4/1990 | Chih . |
| 5,015,393 | 5/1991 | Russell . |
| 5,022,992 | 6/1991 | Looker . |
| 5,057,219 | 10/1991 | Fujiwara . |
| 5,198,125 | 3/1993 | Coudriet et al. . |
| 5,330,660 | 7/1994 | Rehenbach . |

FOREIGN PATENT DOCUMENTS

| | | | |
|---|---|---|---|
| 2485383 | 12/1981 | France | 210/525 |
| 2839410 | 5/1979 | Germany | 210/527 |
| 45-28877 | 9/1970 | Japan | 210/527 |
| 3-101887 | 4/1991 | Japan | 210/527 |
| 9202848 | 1/1992 | Sweden . | |
| 601116 | 6/1978 | Switzerland | 210/527 |
| 1184477 | 3/1970 | United Kingdom . | |
| 1541853 | 3/1979 | United Kingdom | 210/527 |

*Primary Examiner*—Thomas M. Lithgow
*Attorney, Agent, or Firm*—E. Alan Uebler

[57] ABSTRACT

Improved skimmer apparatus for use in dissolved air floatation basins employed in water purification and waste water treatment plants is provided. The invention includes centrally positioned, longitudinal guide rails affixed to the basin and two or more interconnected reciprocating carriages, each carriage having a skimmer blade affixed thereto, the carriages being moveably mounted on the rails. At the effluent end of the basin is an upwardly shaped ramp, and the carriage nearest in proximity to the ramp has a ramp profile duplicating mechanism pivotally mounted to it. The carriages with attached skimmer blades are advanced at desired time and distance intervals advancing the sludge from the influent end of the basin toward the effluent end of the basin and the ramp, until the carriage having the ramp profile duplicating mechanism advances to and upwardly upon the ramp, the skimmer blade affixed thereto raising the sludge above the liquid level thereat, thereby removing excess liquid and depositing the sludge into a hopper for disposal. The skimming blades are then raised above the liquid/sludge surface and returned to the place of beginning and the skimming cycle is repeated.

8 Claims, 5 Drawing Sheets

APPARATUS FOR THE REMOVAL OF FLOATING SLUDGE IN DISSOLVED AIR FLOATATION BASINS AT WATER PURIFICATION AND WASTE WATER TREATMENT PLANTS

BACKGROUND OF THE INVENTION

1. Technical Field

The present invention relates to the purification of liquids, including water, milk and the like, utilizing an air floatation basin and a skimming device for removal of floating sludge. The skimming device reciprocally transports floating sludge contained in such floatation basins, often used, e.g., at water purification and waste water treatment plants.

The device of the invention has one or more skimming blades and one profile-following, preferably flexible-edged skimming blade which raises the sludge above the liquid level line thereby removing excess liquid just prior to depositing the sludge into a collecting hopper for removal and disposal. The apparatus is manufactured of corrosion resistant materials, has few moving parts, produces a relatively low percentage of liquid in the removed sludge and is easily operated and serviced.

2. Description of the Prior Art

Floatation methods have been applied in purification of liquids, especially water, and are mainly used when high purification of the impure water is required. The floatation is carried out in a floatation basin wherein the impurities floated out collect as a scum or sludge on the surface of the liquid, whereupon the scum is removed by scoops or with the aid of suction means. The floatation basin may be of various shapes, but those generally used are cylindrical or rectangular.

Dissolved air floatation basins produce large quantities of floating sludge which must be removed from the basins at set intervals. These basins are normally constructed to a smaller scale than conventional gravity settling basins due to their effectiveness in removing large quantities of chemically flocculated particulates from the water purification plant influent. Floated dissolved air floatation sludge is removed from the basin by utilizing a skimming mechanism to shift the sludge and deposit it into a sludge hopper located at the effluent end of the basin. An objective of such devices is to remove the floated dissolved air floatation sludge at the highest possible dry solids content in order to decrease the volume of sludge for direct disposal or further dewatering processes, thus decreasing disposal and further dewatering process expenses. These basins may utilize an inclined or upwardly curved ramp at the sludge hopper end of the basin. This ramp is used to separate the water elevation and the hopper to prevent an excess of purified water from escaping into the sludge hopper. The skimming mechanism must traverse this ramp in order to deposit the sludge into the hopper, thereby necessitating the need for the skimming blade profile's line of action to follow the contour of the ramp. In order for the ramp to provide the maximum dewatering of the sludge, the ramp must be built of a specific radius or slope. The longer the sludge remains on the ramp, the more effective is the dewatering of the sludge. Thus, by building a ramp with a large diameter or a gradual slope, the skimming mechanism can retain the sludge on the ramp above the purified water level for a set period of time to provide thorough sludge dewatering before complete removal of the sludge into the sludge hopper.

Chain driven skimmers have been used previously in many dissolved air floatation basins to remove the sludge which, little by little, floats to the liquid surface. These chain driven skimmers consist of one or more skimming blades which extend across the basin and which are towed forwardly by means of continuously working chains and sprockets. These constructions have certain advantages by providing a good cleansing result and have in other respects a good functionality security as long as the construction is intact. In spite of its solid basin construction, however, serious breakdowns often occur due to the tremendous corrosion which all components, including the chains, are subjected to because the environment in the settling basins of the purification plants is very corrosive. Chain driven skimmers, moreover, require a large distance between water surface and walking bridges which leads to high building costs and clearance problems in existing facilities. The use of chain type skimmers dictates the curvature or slope of the ramp located at the sludge hopper end of the basin. This curvature or slope is not always adequate for thorough dewatering of the sludge before it is completely removed. In order to increase the curvature or slope of the ramp, taller sprockets must be employed which increases the building height even further, adding significantly to the expense of the installation.

Thus there exists a need for a type of skimmer device to thoroughly dewater and remove dissolved air floatation sludge by means of a skimming blade capable of duplicating its line of advance along a radius or mildly sloped, upwardly extending ramp.

SUMMARY OF THE INVENTION

It has been shown possible to solve the above mentioned problem by means of the device of the present invention which is characterized by a traverse beam, centrally placed over and in the longitudinal direction of a floatation basin, whereby a series of directly interconnected carriages are moveably mounted to the traverse beam and wherein the carriages are each provided with a hinged skimming blade mounted to the carriage. The carriage in closest proximity to the sludge hopper is provided with means for mimicking the exact profile of the basin sludge ramp during advancing motion of the carriage toward the hopper by means of a ramp profile duplicating attachment. The first carriage is arranged to be moved by reciprocal pushing means arranged on the traverse beam, wherein the first, last and, if present, intermediate carriages are rigidly interconnected. Their movement is generated by a driving device, such as a reducing gear motor having an eccentric arm, a hydraulic cylinder or the like. The skimmer blades are arranged to extend below the liquid/scum surface in the basin.

The skimming cycle is as follows: A cycle is started by lowering the skimmer blades below the liquid/scum surface in a first position, and then moving the skimmer carriages in equal increments step by step toward the sludge hopper, such that the liquid surface is skimmed. When the skimmer blade closest to the sludge hopper approaches the ramp to the sludge hopper, the ramp profile duplicating means attached to the carriage skimmer blade engages a ramp profile attachment allowing the attached skimmer blade edge to follow the upward contour of the ramp, i.e., the second position. The skimmer blade preferably has a flexible bristle brush, a rubber blade or the like, affixed thereto to assist in the effective removal of excess liquid from the sludge. The skimmer blades are then elevated above the liquid line and returned at the same rate, step by step, to the first position, i.e., the point of beginning.

For use in long basins or where considerable amounts of floating sludge are encountered, more than two carriages with skimmer blades can be employed wherein all of the carriages are rigidly connected to one another in a manner such that a series of carriages will move as one unit. One feeds from a first position which can be somewhere along the surface of the basin to a second position closer to the sludge hopper. A preceding blade takes over the floating sludge from a following skimmer blade at the beginning of a repeat cycle and moves the sludge forward accordingly.

More specifically, apparatus for the purification of a liquid containing impurities using reciprocating skimming means is provided. The apparatus comprises a dissolved air floatation basin having an influent end and an effluent end, means for feeding into the basin the impure liquid to be purified at its influent end and hopper means affixed to the effluent end into which the impurities, sludgelike in form, are deposited and subsequently removed. The basin has an upwardly curved ramp traversing its effluent end adjacent the hopper, wherein the uppermost edge of the ramp extends upwardly above the water line. The floatation basin has centrally positioned longitudinal guide rails extending from its influent end to its effluent end upon which are mounted at least two reciprocating moveable, rigidly interconnected carriages. The carriages are reciprocally moved longitudinally along the guide rails, each carriage having a rigid skimmer blade affixed thereto and extending downwardly therefrom, each skimmer blade traversing the width of the basin, which blades skim the sludge from the liquid surface. The carriage mounted in closest proximity to the effluent end of the basin has ramp profile duplicating means which enable its attached skimmer blade to duplicate the profile of the ramp as the carriage advances over the ramp. The skimming edge of that blade thereby follows the profile of the surface of the ramp in close proximity thereto or in contact therewith, whereby the reciprocating means advances the carriages and skimming blades at desired time and distance intervals such that the skimmer blades skim the sludge and advance it from the influent end toward the effluent end until the carriage having the ramp profile duplicating means advances to and passes over the ramp, its blade skimming edge duplicating the profile of the ramp in close proximity thereto or in contact therewith. This blade pushes the sludge along the ramp and raises the sludge above the liquid line thereat, removing excess liquid through the action of gravity forces, and then deposits the sludge over the uppermost edge of the ramp into the hopper. The apparatus includes means for raising the skimmer blades above the liquid/sludge surface when the sludge has been deposited into the hopper and returning the carriages with raised skimmer blades back to the place of beginning, at which point means for lowering the skimming blades into the sludge are employed and the entire aforesaid skimming cycle is repeated. The carriage having ramp profile duplicating means preferably has brush means affixed to the downward skimming edge of its attached skimmer blade to further enhance removal of excess liquid from the sludge. Movement of the carriages may be paused for a desired time interval when the sludge is elevated upon the ramp above the liquid line but not yet deposited into the hopper, to permit excess liquid entrapped within the sludge to flow back into the basin, followed by depositing the sludge into the hopper. The skimming blade of the carriage having ramp profile duplicating means, in another preferred embodiment, has flexible skimming edge means. The ramp profile duplicating means preferably employs a pivotable ramp duplicating arm which is pivotally attached to the carriage which, during indexing of the carriage toward the hopper, engages cooperating ramp profile guide means affixed to the guide rails above the ramp by means of roller guide arms affixed to the duplicating arm. The ramp guide profile means duplicates the the contour of the ramp as the carriage passes over the ramp. The duplicating arm pivots and follows the contour of the ramp profile means as the carriage passes over the ramp, thereby mimicking the contour of the ramp and allowing the skimming edge of the skimmer blade affixed to the carriage to substantially exactly duplicate the contour of the surface of the ramp in close proximity thereto or in contact therewith. The apparatus may have more than two reciprocally moveable, rigidly interconnected carriages.

Figure 1:
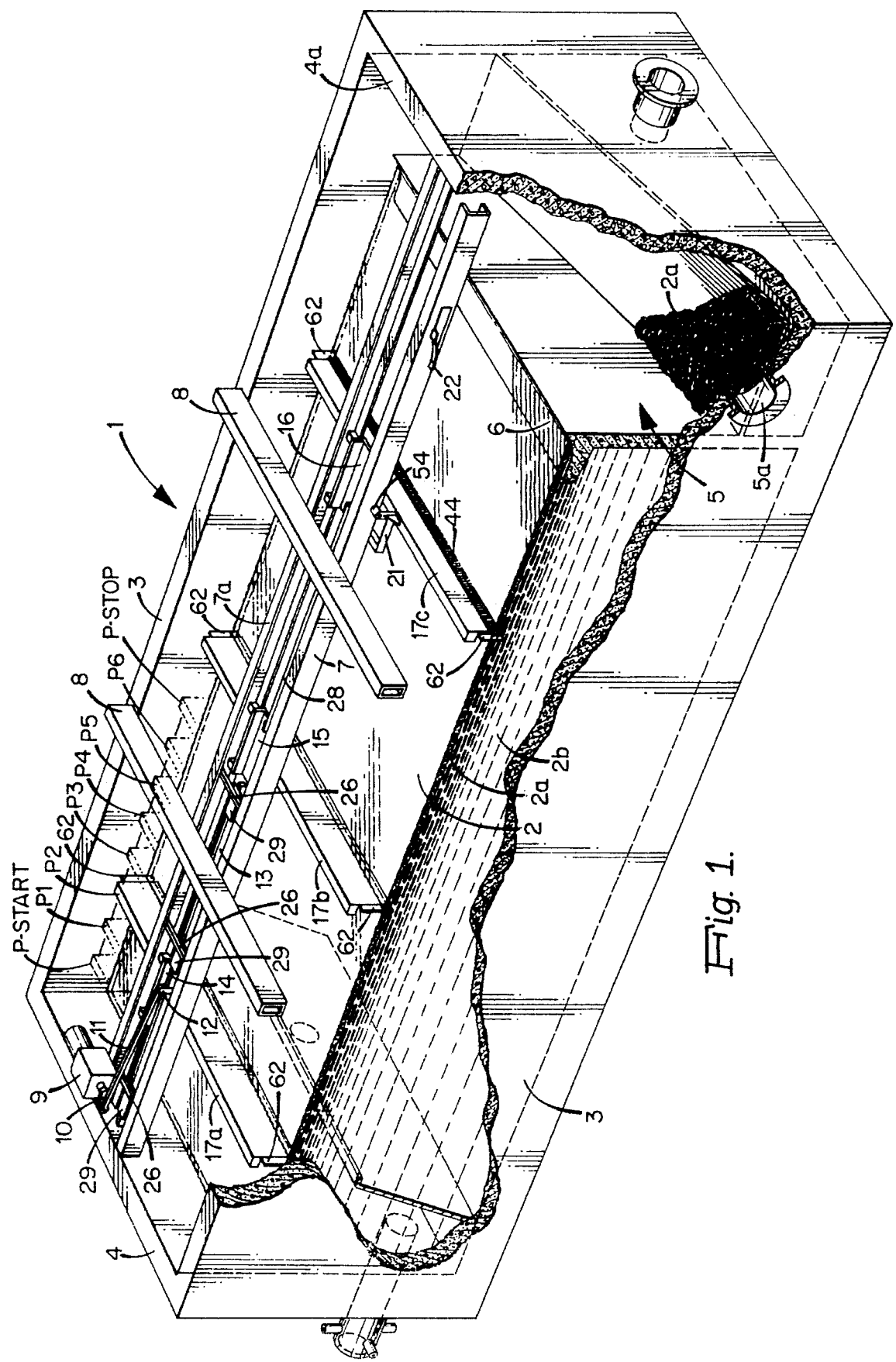
FIG. 1 is a perspective view, partially broken away, of the apparatus according to the invention.

DETAILED DESCRIPTION OF THE INVENTION AND PREFERRED EMBODIMENTS WITH REFERENCE TO THE DRAWINGS

Improved skimmer apparatus for use in dissolved air floatation basins employed in liquid purification and waste water treatment plants is provided. The invention includes centrally positioned, longitudinal guide rails affixed to the basin and two or more interconnected reciprocating carriages, each carriage having a skimmer blade affixed thereto, the carriages being moveably mounted on the rails. At the effluent end of the basin is an upwardly curved ramp, and the carriage nearest in proximity to the ramp has a ramp profile duplicating mechanism pivotally mounted to it. The carriages with attached skimmer blades are incrementally advanced at desired time and distance intervals advancing the sludge from the influent end of the basin toward the effluent end of the basin and the ramp, until the carriage having the ramp profile duplicating mechanism advances to and upwardly upon the ramp, the skimmer blade affixed thereto raising the sludge above the liquid line thereat, thereby draining excess liquid, and depositing the sludge into the hopper for disposal. The blades are then raised above the liquid/sludge surface line and returned to the place of beginning and the cycle is repeated.

A detailed description of the invention and preferred embodiments is best provided by reference to the accompanying drawings, FIGS. 1–9, wherein a dissolved air floatation basin 1 contains liquid 2b and floating sludge 2a floating atop liquid 2b, the liquid/sludge having upper surface 2, wherein the liquid/sludge is constrained by the two long sides 3 and front and rear short sides 4 and 4a of basin 1 and having sludge hopper 5 with upwardly extending inclined ramp 6 (FIG. 1) located at the effluent end of basin 1.

Figure 6:
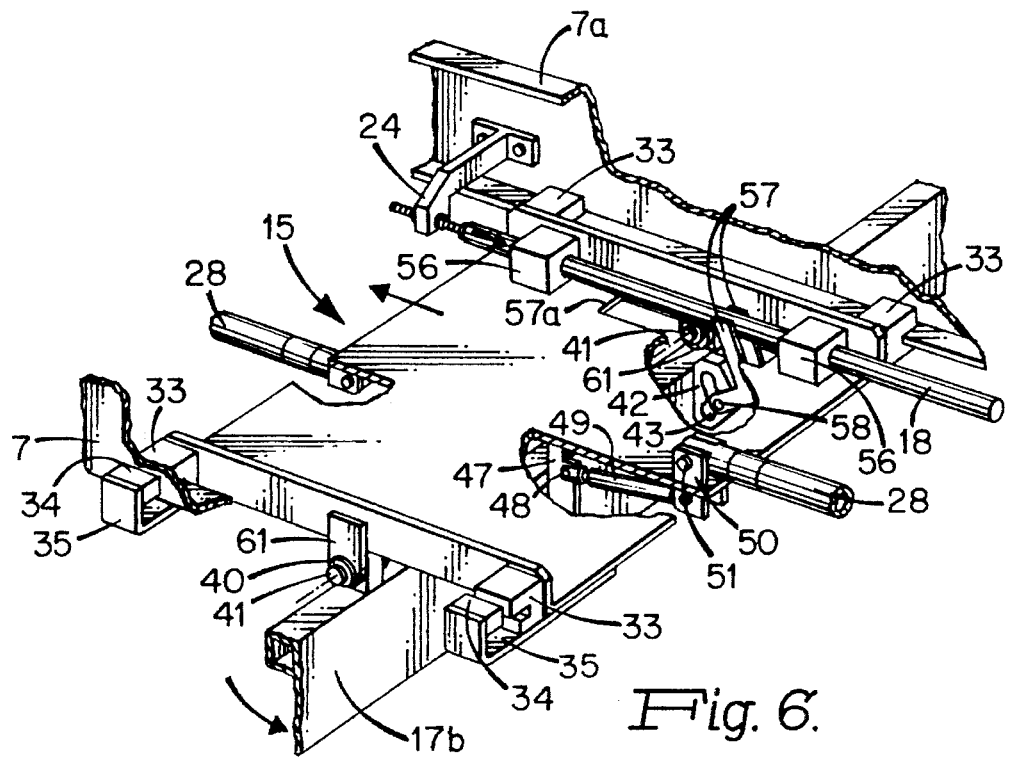
FIG. 6 is a perspective view of an intermediate carriage optionally utilized in the apparatus according to the invention.
Figure 7:
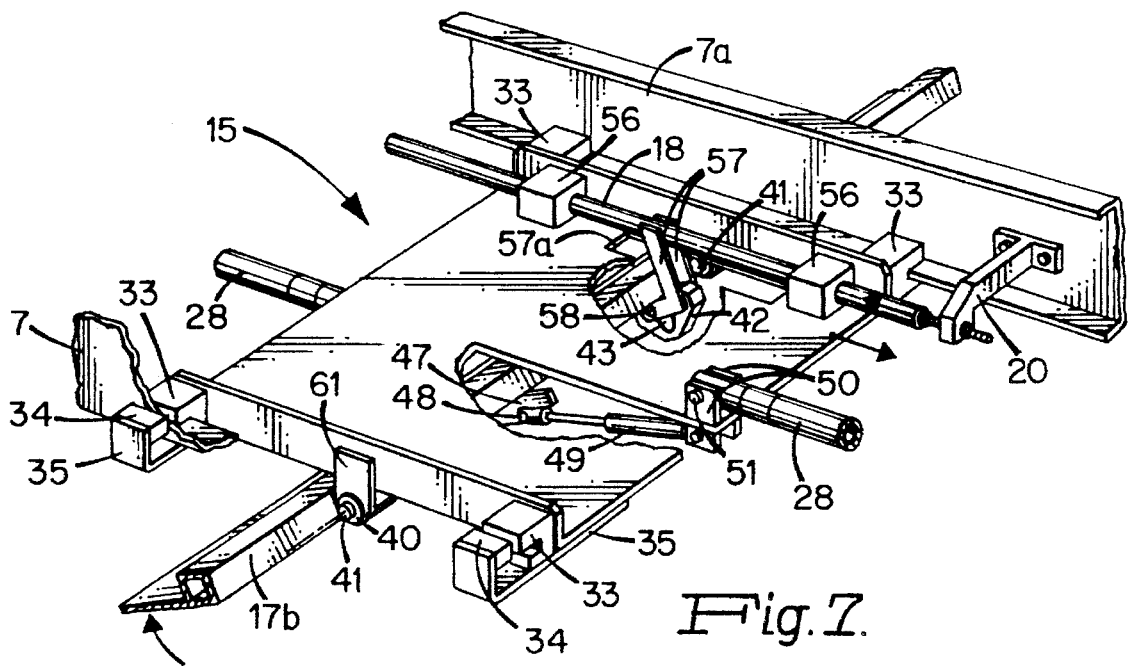
FIG. 7 is a perspective view of an intermediate carriage showing its attached skimming blade being lifted out of the sludge prior to returning to its point of beginning.
Figure 8:
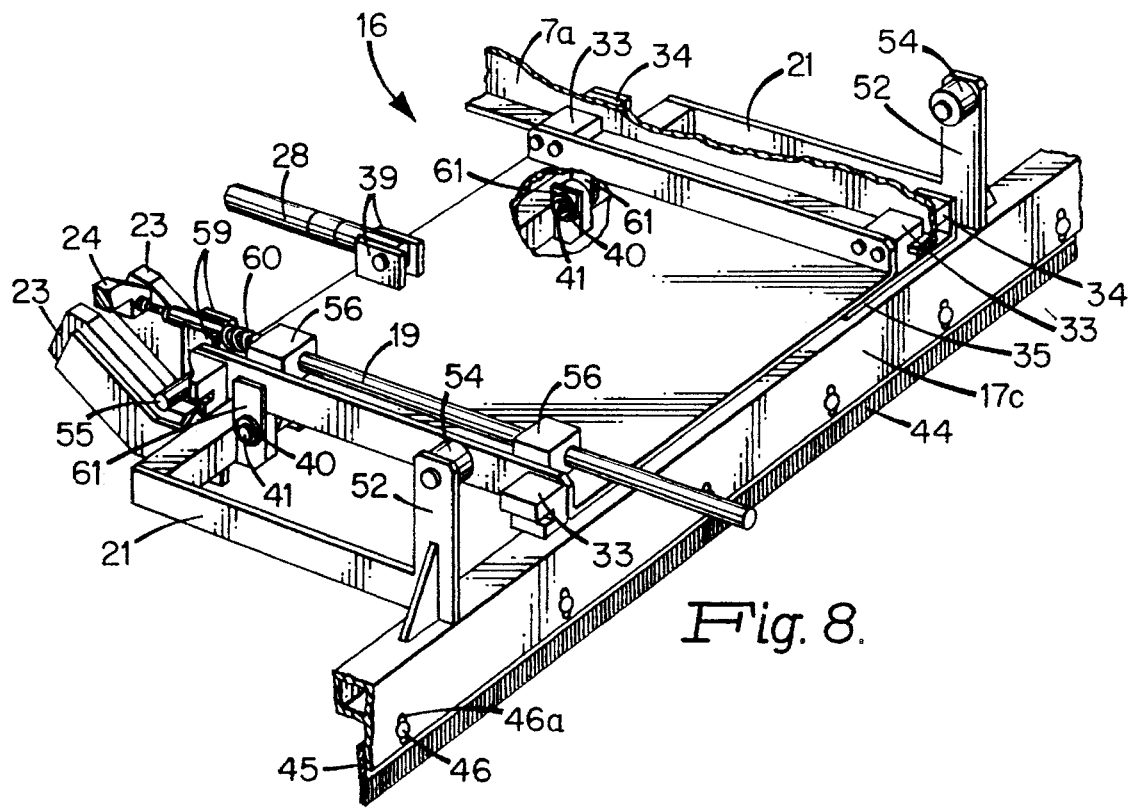
FIG. 8 is a perspective view of the end, ramp profile duplicating mechanism, showing its attached skimming blade in the down position.
Figure 9:
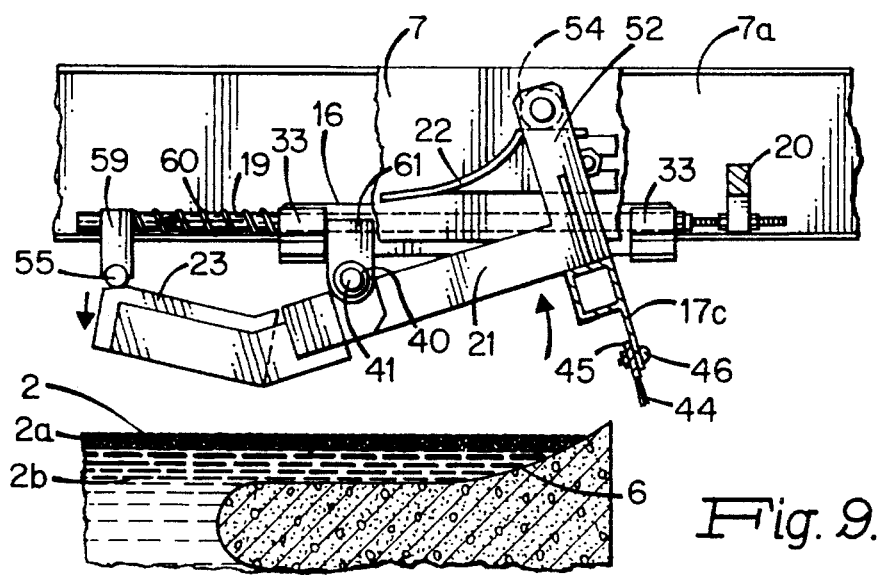
FIG. 9 is a side sectional view of the end carriage at the end of its travel showing the ramp profile duplicating arm after the sludge has been dumped; this corresponds to the same point of carriage travel as depicted in FIG. 2.

Above the basin 1, traverse beams 7 and 7a are attached to the short ends 4 and 4a of the dissolved air floatation basin 1 and to supporting beams 8. A gear reducer and motor 9, mounted to the traverse beam 7a, is provided with an eccentric arm 10 and a tie rod 11. The tie rod 11 is pivotally mounted to bracket 12 which is rigidly attached to the drive shaft 13. The radius of the eccentric arm 10 is adapted to a desired stroke 10a (FIG. 3) of the drive shaft 13. It is possible to replace the gear reducer and motor 9, eccentric arm 10 and tie rod 11 with a hydraulic cylinder, pneumatic cylinder or the like, directly or indirectly connected to the drive shaft 13 for driving the apparatus. The drive shaft 13 translates the circular motion of the gear reducer and motor 9, eccentric arm 10 and tie rod 11 into linear, reciprocating motion (stroke 10a), which propels skimmer carriages 14, 15 and 16 forwardly or backwardly. Skimmer blades 17a, 17b and 17c are hingedly mounted to skimmer carriages 14, 15 and 16 respectively, extending downwardly therefrom. Turning switches 18 and 19 (FIGS. 4, 6 and 8) are arranged on skimmer carriages 14, 15 and 16, as shown. The skimmer carriages 14, 15 and 16 are indexed toward sludge ramp 6 and sludge hopper 5 of dissolved air floatation basin 1. When the skimmer carriages 14, 15 and 16 having skimmer blades 17a, 17b and 17c reach the preset limit, the turning switches 18 and 19 abut the turning stops 20 (FIGS. 6 and 7). The turning switches 18 and 19 push the skimmer blades 17a, 17b and 17c upward and lock them in a retracted position above the liquid/sludge surface 2. A means of locking the skimmer blade 17c above the liquid/sludge surface 2 utilizes a profile duplicating arm 21 and ramp profile attachment 22 (FIGS. 1, 2 and 9) whereby the profile duplicating arm 21 is pivotally mounted to the skimmer carriage 16 and rigidly connected to the skimmer blade 17c as shown. When the profile duplicating arm 21 rides up along the ramp profile attachment 22 and reaches the turning stop 20, the turning switch 19 is pushed rearwardly and engages the rests 23 which lock the skimmer blade 17c in a position above the liquid/sludge surface 2, as shown in FIG. 9. The skimmer carriages 14, 15 and 16 subsequently reverse their line of travel and return the skimmer blades 17a, 17b and 17c, all now in an elevated position described further below, back over the liquid/sludge surface 2 to the first beginning position where the skimmer blades 17a, 17b and 17c are lowered downwardly by means of a second turning switch 24 (FIGS. 6 and 8). The skimmer carriages 14, 15 and 16 then again reverse their line of travel and a new skimming cycle begins.

Figure 3:
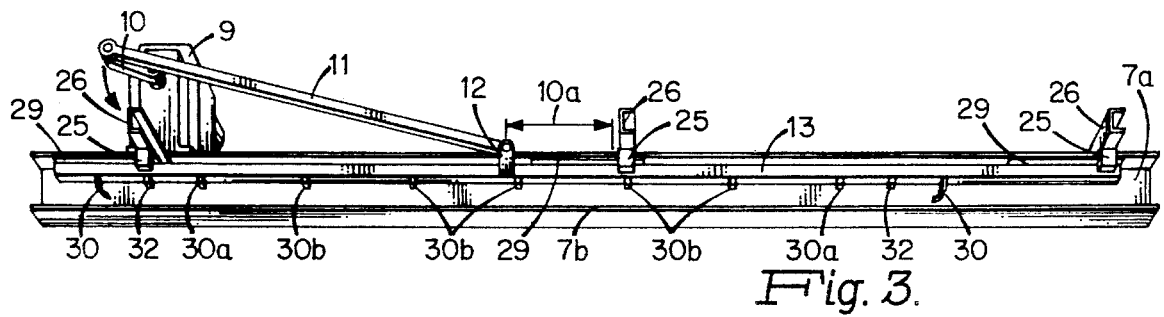
FIG. 3 is a perspective view of the driving mechanism used to advance and reverse the travel of the skimming blades.

The drive shaft 13 is guided and supported by means of gliding shoulders 25 arranged on the traverse beam crossing supports 26 (FIG. 3) which in turn are welded to the traverse beams 7 and 7a. The length of the drive shaft 13 is determined by the distance of travel desired for the first skimmer carriage 14. Carriage 14 is rigidly connected to forwardly mounted skimmer carriages 15 and 16 via adjustable tie rods 28 (FIG. 4) to provide means of locomotion for all skimmer carriages 14, 15 and 16. Flat plates 29 (FIG. 3) are affixed to the drive shaft 13, which plates glide back and forth through the gliding shoulders 25. The length of these flat plates 29 is determined by the length of the stroke of the drive shaft 13 and the length of the gliding shoulders 25. The gliding shoulders 25 permit the drive shaft 13 to travel in a horizontal direction and prevent any lateral or vertical motion of the drive shaft 13. Rigidly connected to the underside of the drive shaft 13 are a number of spaced flat bars 30a and 30b, as shown, and on each end of the drive shaft 13 a bent flat bar 30 is attached (FIG. 3). The radius of the bent flat bar 30 is determined by the shape of the driving block 31. Each flat bar 30a and 30b is spaced apart the distance of the desired stroke 10a. An additional flat bar 32 is placed between the flat bar 30a and the bent bar 30 at a distance equal to the length of the driving block 31 plus a few millimeters.

Figure 4:
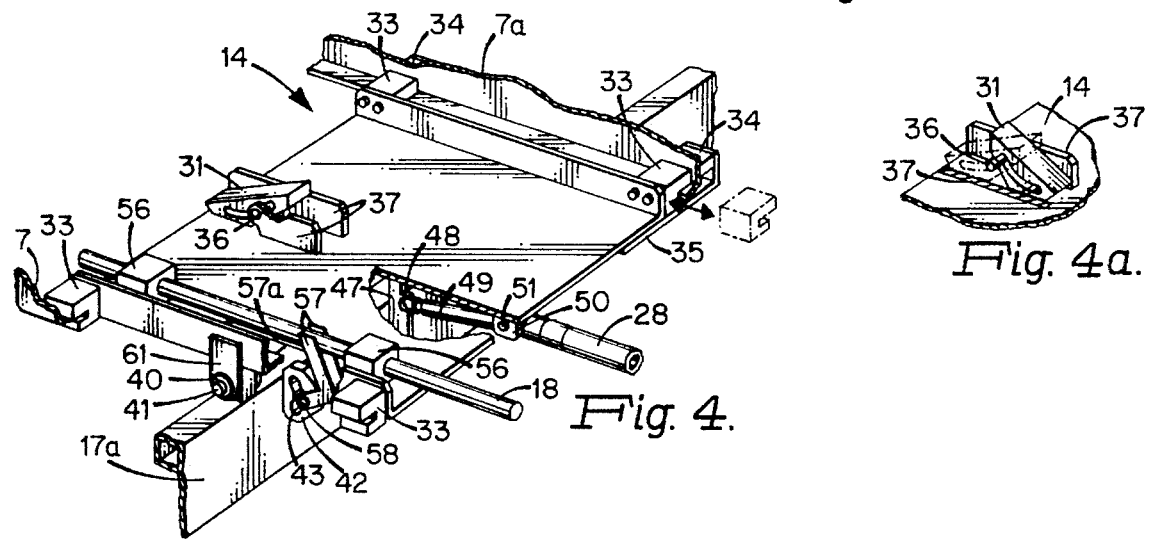
FIG. 4 is a perspective view of the first carriage used in the invention to skim the sludge, showing the driving block on the return mode.
Figure 4A:
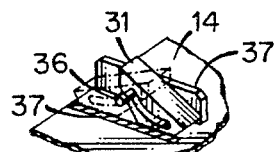
FIG. 4a is a perspective view showing the driving block in its forward motion position.

All skimmer carriages 14, 15 and 16 are horizontally guided by four guiding blocks 33 and two adjusting guiding blocks 34 (FIGS. 4, 6 and 7). Guide blocks 34 are bolted to flat bar 35. On the first skimmer carriage 14, a driving block 31 is pivotally mounted by a shaft bolt 36 through the flat bars 37. The driving block 31 is characterized by its triangular form having rounded edges and arc-shaped slot in which shaft bolt 36 rides. On all forwardly mounted skimmer carriages 15 and 16, an adjustable tie rod 28 is connected by bolts 51 to flat bars 50 to provide a transference of locomotion from the first skimmer carriage 14.

The length of the skimmer blades 17a, 17b and 17c are adapted to the width of the dissolved air floatation basin 1, and the height of the blades 17a, 17b and 17c are determined by the variation in the liquid/sludge surface 2 caused by high and low flow conditions to the liquid or waste water treatment plant. The skimmer blades 17a, 17b and 17c are mounted on two bearings 40 suspended from underneath the skimmer carriages 14, 15 and 16 by means of flat bars 61 and shaft 41. A turning switch lock 42 (FIGS. 4, 6 and 7) is mounted to the front side of the skimmer blades 17a, 17b and 17c on all skimmer carriages 14 and 15 but not on the last skimmer carriage 16. The turning switch lock 42 is designated by its triangular opening 43 with three recesses arranged to receive a running roll 58. A flexible brush 44 or the like is mounted to the backside of the skimmer blade 17c on carriage 16 by a flat bar 45 with bolts 46 through elongated holes to provide for adjustability of the flexible brush 44. Welded to the center of the skimmer blades 17a and 17b on skimmer carriages 14 and 15 is a flat plate 47 with a mounting hole drilled to accept bolt 48 which connects the gas filled pistons 49. The opposite ends of pistons 49 are connected to flat bars 50 by means of pins 51 underneath skimmer carriages 14 and 15 to provide a dampening effect for the blade lowering operation (FIGS. 4, 6 and 7).

The forwardmost or last skimmer carriage 16 is equipped with a profile duplicating arm 21. The L-shaped profile duplicating arm 21 having extension 52 as shown in FIGS. 8 and 9 is mounted to the underside of skimmer carriage 16 by means of shaft 41 through bearings 40 (FIGS. 8 and 9). Attached to the front of the profile duplicating arm 21, on the extension 52, are mounted bearings 54. The extensions 52 are positioned such that they extend outwardly alongside traverse beams 7 and 7a.

Figure 2:
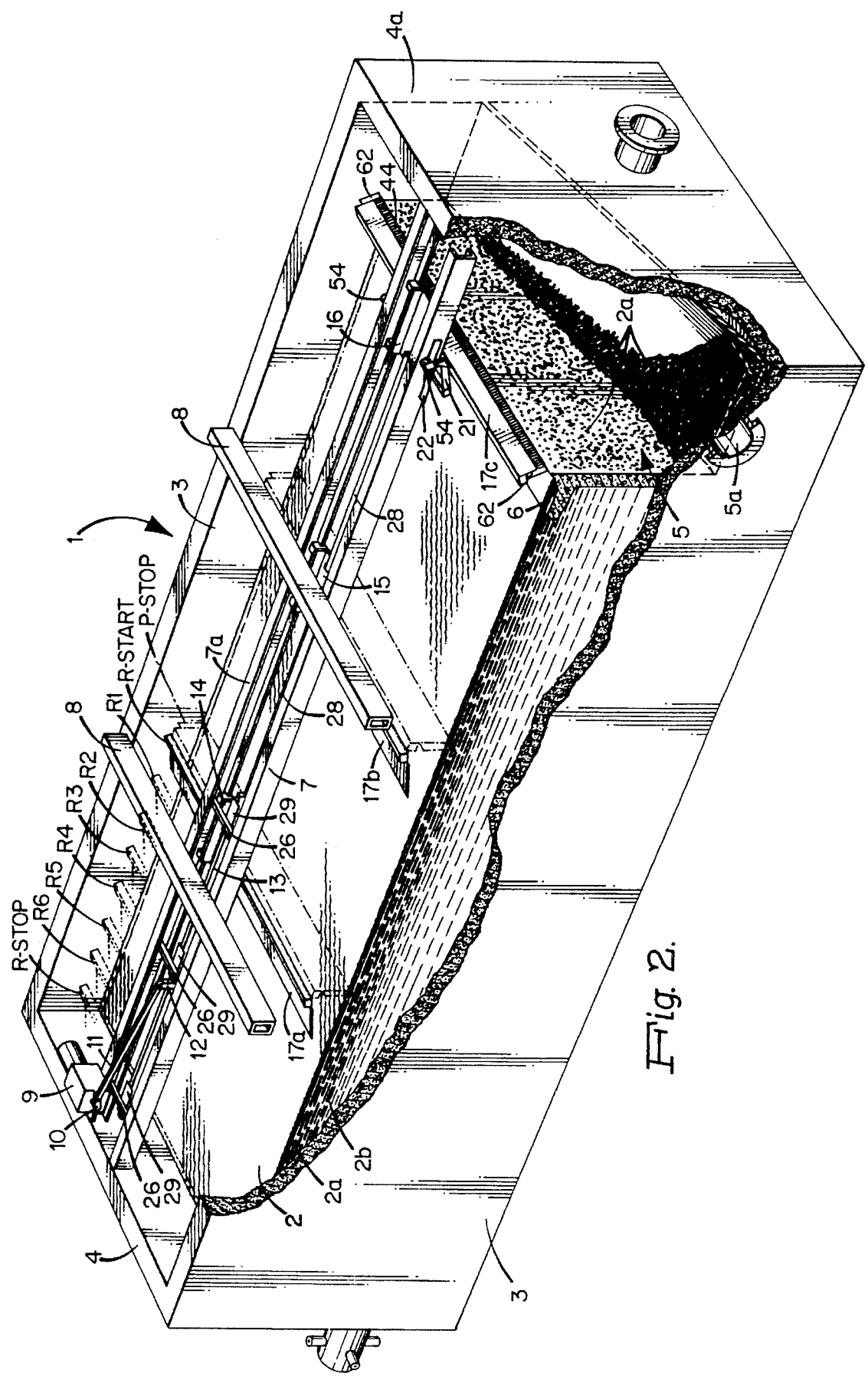
FIG. 2 is a perspective view of the apparatus of the invention, partially broken away, just after the sludge floating on the surface of the liquid has been pushed into the hopper.

Two ramp profile means 22 (FIGS. 1, 2 and 9) are attached to the outer sides of the traverse beams 7 and 7a coinciding with the location of the sludge ramp 6 (FIGS. 1, 2 and 9). The elevation of the ramp profile means 22 is determined from the elevation of the bearing 54 located on the extension 52 of the profile duplicating arm 21. The shape of the ramp profile means 22 is adapted to or determined by the desired or existing shape of the sludge ramp 6. Two rests 23 are bolted to the back end of the profile duplicating arm 21 (FIGS. 8 and 9) which are constructed to allow locking pin 55 to restrain the duplicating arm 21 in an elevated position. The skimmer blade 17c is welded to the underside of the profile duplicating arm 21. A flexible brush 44 or the like is preferably mounted to the backside of the skimmer blade 17c extending along its skimming edge by a flat bar 45 with bolts 46 through elongated holes 46a (FIG. 8) to provide for adjustability of the flexible brush 44. A flexible rubber strip 62 or the like may be bolted to the ends of the skimmer blades to prevent any floating sludge from escaping between the ends of the blades and the walls 3 of the basin.

The turning switch 18 is guided through two guider assemblies 56 mounted on top of skimmer carriages 14 and 15. Turning switch 18 is provided with a pair of "L" shaped brackets 57 which are inserted through the turning switch lock 42 by means of running roll 43 and shaft bolt 58 (FIGS. 4, 6 and 7).

The turning switch 19 is guided through guiders 56 mounted on top of skimmer carriage 16. This turning switch 19 is provided with two flat bars 59 welded to the turning switch 19 and the locking pin 55.

The material of the gliding shoulders 25, guiding blocks 33, adjusting guiding blocks 34, rests 23 and bearings 40 is selected from construction plastic polymers such as polyamide, polyacetal, or high density polyethylene. There are somewhat higher demands on hardness and wear resistance with regard to the driving block 31 and running roll 43. Therefore a more suitable material for these components is PAS LX, or the like, which is a polyacetal based material. All metal components are preferably of stainless steel.

Drive shaft 13, with its flat bars 30a and 30b, pushes the first skimmer carriage 14, which in turn pushes the intermediate and last skimmer carriages 15 and 16 by means of adjustable tie rods 28. Each skimmer carriage 14, 15 and 16 is equipped with skimmer blades 17a, 17b and 17c, respectively, and turning switch 18 or 19, whereby the entire assembly is indexed forward in the skimming (first) position toward the turning stop 20. When the skimmer carriages 14, 15 and 16 reach their respective turning stops 20, the turning switches 18 or 19 abut the turning stop 20, which lifts the skimmer blades 17a, 17b and 17c by pushing the running roll 43 horizontally into the turning switch lock 42 on the first and intermediate carriages 14 and 15. The locking pin 55 locks the profile duplicating arm 21 on the last skimmer carriage 16 into the second raised position, whereby the skimmer carriages 14, 15 and 16 reverse their line of travel and return toward their first beginning position.

Figure 5:
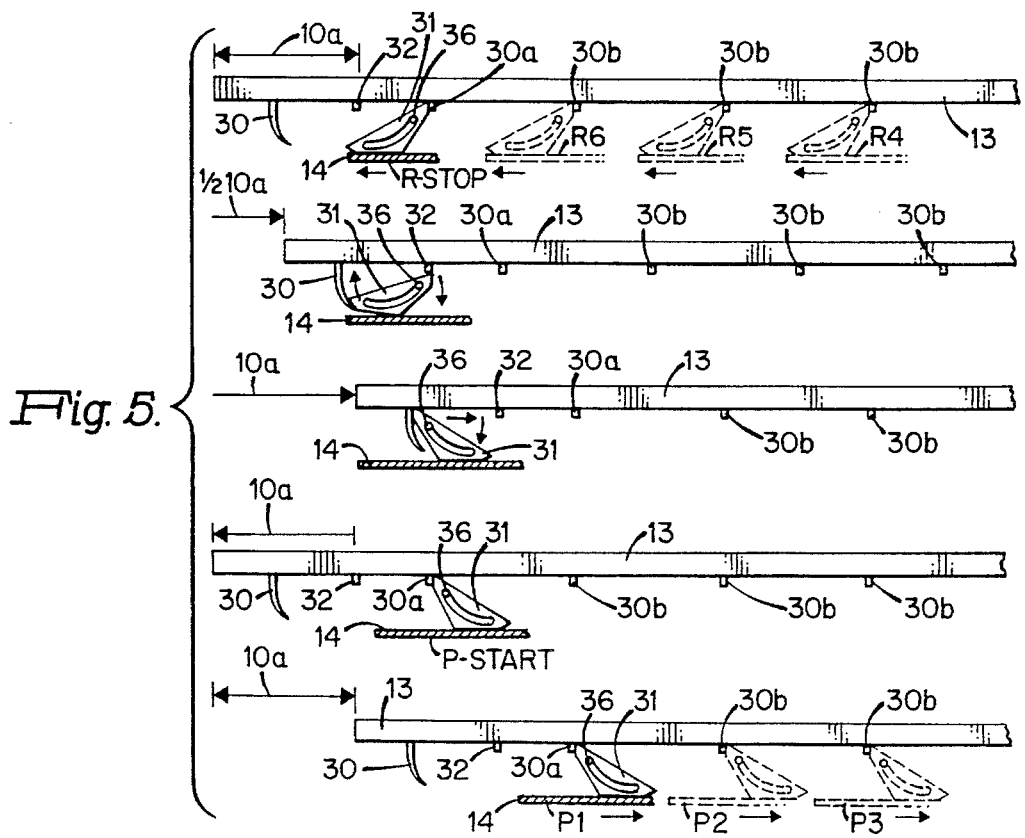
FIG. 5 is a schematic diagram of the sequence of travel forwardly and in reverse of the direction of movement of the carriages of the invention.

Drive shaft 13 changes the direction of movement of the skimmer carriages 14, 15 and 16 and flat bar 32 pushes the left side of the driving block 31 downwardly and pivotally raises its right side while the bent flat bar 30 is positioned underneath the right side of driving block 31. The flat bar 32 then slides off of the driving block 31 and the right side of the driving block 31 falls down on top of the bent flat bar 30. By means of the movement of the drive shaft 13, the bent flat bar 30 pushes the right side of the driving block 31 upwardly toward the corner of the flat bar 30 and the drive shaft 13 simultaneously as the driving block 31 pivots on shaft bolt 36. The left side of the driving block 31 is pushed down against the first skimmer carriage 14 and is now set in the second position to return the skimmer carriages 14, 15 and 16 to the front of the dissolved air floatation basin 1 (FIG. 5).

The driving block 31, having been changed to the second position, is now contacted by the flat bar 30a and pulled toward the front of basin 1, one stroke length at a time, whereby the drive shaft 13 is reciprocating back and forth and the next flat bar 30b glides across the driving block 31 pivoting the right side of the driving block 31 downwardly. Driving block 31 is then released to pivot upwardly once again. The same flat bar 30b engages driving block 31 on the return movement of the drive shaft 13 which pivotally forces the left side of the driving block 31 downwardly against the surface of the first skimmer carriage 14 thereby moving the skimmer carriages 14, 15 and 16 backwardly toward the front (influent end) of basin 1. This reciprocating motion of drive shaft 13 permits each flat bar 30a and 30b to contact and push or pull skimmer carriages 14, 15 and 16 step by step until the turning switches 18 and 19 reach their respective turning stops 20 or 24 at the first, beginning position. At that point, on the first and intermediate skimmer carriages 14 and 15, turning switch 18 abuts turning stop 24 which then pushes running roll 43 from the lower locking point which allows gas filled pistons 49 to gradually lower the skimmer blades 17a and 17b under the force of gravity to a vertical position extending into the basin 1 as shown in FIG. 6. Simultaneously, on the last skimmer carriage 16, the turning switch 19 gradually lowers profile duplicating arm 21 to a vertical position by means of locking pin 55 gliding down rests 23 as shown in FIG. 8. Spring 60 dampens the sudden release of the profile duplicating arm 21 to prevent the skimmer blade 17c from splashing into the liquid/sludge surface 2. On the first and intermediate skimmer carriages 14 and 15, the running roll 58 then enters the upper locking point of the turning switch lock 42. Drive shaft 13 then changes the direction of the driving block 31 as described, and the direction of the skimmer carriages 14, 15 and 16 changes to the first position to again effectively push the floating sludge toward the sludge ramp 6 (FIG. 1).

The apparatus of the invention has been described in which two (2) or three (3) carriages are employed. This is for convenience only. A plurality of carriages greater than three may be utilized for long floatation basins.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Apparatus for the purification of a liquid containing impurities using reciprocating skimming means, said apparatus comprising a dissolved air floatation basin having an influent end and an effluent end, means for feeding into said basin the impure liquid to be purified at its influent end, hopper means affixed to said effluent end into which said impurities, sludgelike in form, are deposited and subsequently removed, said basin having upwardly shaped ramp means traversing its effluent end adjacent said hopper means, the uppermost edge of said ramp extending above the liquid line, the floatation basin having centrally positioned longitudinal guide rails extending from its influent end to its effluent end upon which are mounted at least one or more reciprocally moveable, rigidly interconnected carriages, means for reciprocally moving said carriage(s) longitudinally along said guide rails, said carriage(s) each having a rigid skimmer blade affixed thereto and extending downwardly therefrom, each skimmer blade traversing the width of said basin, the carriage mounted in closest proximity to said effluent end of said basin having ramp profile duplicating means providing for its attached skimmer blade to duplicate the profile of said ramp as said carriage advances over said ramp, the skimming edge of that blade thereby following the profile of the surface of said ramp in close proximity thereto or in contact therewith, whereby said reciprocating means advances said carriage(s) and skimming blades at desired time and distance intervals such that said skimmer blades skim said sludge and advance it from the influent end toward the effluent end until said carriage having said ramp profile duplicating means advances to and passes over said ramp, its blade skimming edge duplicating the profile of said ramp in close proximity thereto or in contact therewith, thereby pushing the sludge along the ramp and raising the sludge above the liquid/sludge level thereat, thereby draining excess liquid, and then depositing said sludge over the uppermost edge of said ramp into said hopper, the apparatus also including means for raising said skimmer blades above the liquid/sludge surface when said sludge has been deposited into said hopper and returning said carriages with attached raised skimmer blades to the place of beginning, and means for lowering said skimming blades at said place of beginning into said sludge and repeating the entire aforesaid skimming cycle.

2. The apparatus of claim 1, said carriage which has ramp profile duplicating means also having brush means affixed to the downward skimming edge of its attached skimmer blade to further enhance removal of excess liquid from of said sludge.

3. The apparatus of claim 1 having means to permit movement of the carriages to pause for a desired time interval when said sludge is elevated upon said ramp above the liquid/sludge surface but not yet deposited into said hopper, to permit excess liquid entrapped within the sludge to flow back into said basin, followed by depositing said sludge into said hopper.

4. The apparatus of claim 1 wherein the skimming blade of said carriage having ramp profile duplicating means has flexible skimming edge means.

5. The apparatus of claim 1 wherein said ramp profile duplicating means comprises a pivotable profile ramp duplicating arm pivotally attached to said carriage which, during indexing of said carriage toward said hopper, engages cooperating ramp profile guide means affixed to said guide rails above said ramp by means of roller guide arms affixed to said duplicating arm, which ramp guide profile means duplicates the contour of said ramp, whereby said duplicating arm pivots and follows the contour of said ramp profile means mimicking the contour of said ramp, thereby allowing the skimming edge of said skimmer blade affixed to said carriage to substantially exactly duplicate the contour of said ramp in close proximity thereto or in contact therewith.

6. The apparatus of claim 1 having more than one reciprocally moveable, rigidly interconnected carriages.

7. The apparatus of claim 1 wherein said carriages and skimmer blade assemblies include dampening means to enable lowering of said blades slowly into the surface of said sludge upon beginning a repeat cycle to prevent the blades from creating wave action at the liquid/sludge surface and disrupting the integrity of the floating sludge.

8. The apparatus of claim 1 wherein said liquid is water.

* * * * *